United States Patent
Auyeung et al.

(10) Patent No.: US 9,066,097 B2
(45) Date of Patent: Jun. 23, 2015

(54) METHOD TO OPTIMIZE THE TRANSFORMS AND/OR PREDICTIONS IN A VIDEO CODEC

(75) Inventors: Cheung Auyeung, Sunnyvale, CA (US); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 1030 days.

(21) Appl. No.: 13/019,068

(22) Filed: Feb. 1, 2011

(65) Prior Publication Data

US 2012/0195377 A1 Aug. 2, 2012

(51) Int. Cl.
- H04N 11/02 (2006.01)
- H04N 11/04 (2006.01)
- H04N 19/11 (2014.01)
- H04N 19/176 (2014.01)
- H04N 19/147 (2014.01)
- H04N 19/122 (2014.01)
- H04N 19/192 (2014.01)

(52) U.S. Cl.
CPC ............ *H04N 19/11* (2014.11); *H04N 19/176* (2014.11); *H04N 19/147* (2014.11); *H04N 19/122* (2014.11); *H04N 19/192* (2014.11)

(58) Field of Classification Search
None
See application file for complete search history.

(56) References Cited

U.S. PATENT DOCUMENTS

| | | | |
|---|---|---|---|
| 7,397,857 B2 | 7/2008 | Romanowski et al. | |
| 8,019,804 B2 * | 9/2011 | Po et al. | 708/402 |
| 8,891,619 B2 * | 11/2014 | Leontaris et al. | 375/240.12 |
| 2006/0153292 A1 | 7/2006 | Liang et al. | |
| 2008/0243971 A1 * | 10/2008 | Po et al. | 708/4 |
| 2009/0003449 A1 * | 1/2009 | Sekiguchi et al. | 375/240.16 |
| 2009/0016626 A1 | 1/2009 | Zhang et al. | |
| 2009/0086816 A1 * | 4/2009 | Leontaris et al. | 375/240.03 |
| 2009/0238271 A1 * | 9/2009 | Kim et al. | 375/240.12 |
| 2011/0090960 A1 * | 4/2011 | Leontaris et al. | 375/240.12 |
| 2011/0170591 A1 * | 7/2011 | Li et al. | 375/240.01 |
| 2011/0243230 A1 * | 10/2011 | Liu | 375/240.14 |
| 2012/0121013 A1 * | 5/2012 | Lainema et al. | 375/240.12 |
| 2013/0128963 A1 * | 5/2013 | Leontaris et al. | 375/240.12 |

OTHER PUBLICATIONS

Wang et al., "Review of Error Resilient Coding Techniques for Real0-Time Video Communications" pp. 1-47.

* cited by examiner

*Primary Examiner* — Gims Philippe
*Assistant Examiner* — Samuel D Fereja
(74) *Attorney, Agent, or Firm* — Haverstock & Owens LLP

(57) ABSTRACT

A joint optimization iterative algorithm determines optimized mode pairs. Each mode pair includes an intra-predictor and a transform pair that are iteratively modified to determine an optimized intra-predictor and an optimized transform that forms the optimized mode pair. A set of training videos and a set of quantization parameters (QPs) are used as the base data for determining the optimized mode pairs. Each video includes a plurality of pixel blocks, herein referred to as blocks. Block statistics associated with each mode pair are accumulated by separately encoding each block using each mode pair, and selecting the best mode pair for each block according to a measured characteristic of each encoding. The accumulated block statistics are used to modify the intra-predictor and the transform within each mode pair.

24 Claims, 5 Drawing Sheets

METHOD TO OPTIMIZE THE TRANSFORMS AND/OR PREDICTIONS IN A VIDEO CODEC

FIELD OF THE INVENTION

The present invention relates to the field of video encoding. More particularly, the present invention relates to optimizing the transforms and predictions used in a video codec.

BACKGROUND OF THE INVENTION

A video codec is a device or software module that enables the use of data compression techniques for digital video data. A video sequence consists of a number of pictures (digital images), usually called frames. Subsequent frames are very similar, thus containing a lot of redundancy from one frame to the next. Before being efficiently transmitted over a channel or stored in memory, video data is compressed to conserve both bandwidth and memory. The goal of video compression is to remove the redundancy, both within frames (spatial redundancy) and between frames (temporal redundancy) to gain better compression ratios. There is a complex balance between the video quality, the quantity of the data needed to represent it (also known as the bit rate), the complexity of the encoding and decoding algorithms, their robustness to data losses and errors, ease of editing, random access, end-to-end delay, and a number of other factors.

A typical digital video codec design starts with the conversion of input video from a RGB color format to a YCbCr color format, and is often followed by chroma sub-sampling to produce a sampling grid pattern. Conversion to the YCbCr color format improves compressibility by de-correlating the color signals, and separating the perceptually more important luma signal from the perceptually less important chroma signal, and which can be represented at lower resolution.

Some amount of spatial and temporal down-sampling may also be used to reduce the raw data rate before the basic encoding process. Down-sampling is the process of reducing the sampling rate of a signal. This is usually done to reduce the data rate or the size of the data. The down-sampling factor is typically an integer or a rational fraction greater than unity. This data is then transformed using a frequency transform to further de-correlate the spatial data. One such transform is a discrete cosine transform (DCT). The output of the transform is then quantized and entropy encoding is applied to the quantized values. Quantization is a compression technique where a range of values is compressed to a single quantum value.

The decoding process consists of essentially performing an inversion of each stage of the encoding process. The one stage that cannot be exactly inverted is the quantization stage. There, a best-effort approximation of inversion is performed. This part of the process is often called "inverse quantization" or "dequantization", although quantization is an inherently non-invertible process.

A variety of codecs can be easily implemented on PCs and in consumer electronics equipment. Multiple codecs are often available in the same product, avoiding the need to choose a single dominant codec for compatibility reasons.

In general, video compression is performed according to many standards, including one or more standards for audio and video compression from the Moving Picture Experts Group (MPEG), such as MPEG-1, MPEG-2, and MPEG-4. Additional enhancements have been made as part of the MPEG-4 part 10 standard, also referred to as H.264, or AVC (Advanced Video Coding). Under the MPEG standards, video data is first encoded (e.g. compressed) and then stored in an encoder buffer on an encoder side of a video system. Later, the encoded data is transmitted to a decoder side of the video system, where it is stored in a decoder buffer, before being decoded so that the corresponding pictures can be viewed.

The intent of the H.264/AVC project was to develop a standard capable of providing good video quality at bit rates that are substantially lower than what previous standards would need (e.g. MPEG-2, H.263, or MPEG-4 Part 2). Furthermore, it was desired to make these improvements without such a large increase in complexity that the design is impractical to implement. An additional goal was to make these changes in a flexible way that would allow the standard to be applied to a wide variety of applications such that it could be used for both low and high bit rates and low and high resolution video. Another objective was that it would work well on a very wide variety of networks and systems.

H.264/AVC/MPEG-4 Part 10 contains many new features that allow it to compress video much more effectively than older standards and to provide more flexibility for application to a wide variety of network environments. Some key features include multi-picture motion compensation using previously-encoded pictures as references, variable block-size motion compensation (VBSMC) with block sizes as large as 16×16 pixels and as small as 4×4 pixels, six-tap filtering for derivation of half-pel luma sample predictions, macroblock pair structure, quarter-pixel precision for motion compensation, weighted prediction, an in-loop deblocking filter, an exact-match integer 4×4 spatial block transform, a secondary Hadamard transform performed on "DC" coefficients of the primary spatial transform wherein the Hadamard transform is similar to a fast Fourier transform, spatial prediction from the edges of neighboring blocks for "intra" coding, context-adaptive binary arithmetic coding (CABAC), context-adaptive variable-length coding (CAVLC), a simple and highly-structured variable length coding (VLC) technique for many of the syntax elements not coded by CABAC or CAVLC, referred to as Exponential-Golomb coding, a network abstraction layer (NAL) definition, switching slices, flexible macroblock ordering, redundant slices (RS), supplemental enhancement information (SEI) and video usability information (VUI), auxiliary pictures, frame numbering and picture order count. These techniques, and several others, allow H.264 to perform significantly better than prior standards, and under more circumstances and in more environments. H.264 usually performs better than MPEG-2 video by obtaining the same quality at half of the bit rate or even less.

MPEG is used for the generic coding of moving pictures and associated audio and creates a compressed video bitstream made up of a series of three types of encoded data frames. The three types of data frames are an intra frame (called an I-frame or I-picture), a bi-directional predicted frame (called a B-frame or B-picture), and a forward predicted frame (called a P-frame or P-picture). These three types of frames can be arranged in a specified order called the GOP (Group Of Pictures) structure. I-frames contain all the information needed to reconstruct a picture. The I-frame is encoded as a normal image without motion compensation. On the other hand, P-frames use information from previous frames and B-frames use information from previous frames, a subsequent frame, or both to reconstruct a picture. Specifically, P-frames are predicted from a preceding I-frame or the immediately preceding P-frame.

Frames can also be predicted from the immediate subsequent frame. In order for the subsequent frame to be utilized in this way, the subsequent frame must be encoded before the predicted frame. Thus, the encoding order does not necessarily match the real frame order. Such frames are usually predicted from two directions, for example from the I- or P-frames that immediately precede or the P-frame that immediately follows the predicted frame. These bidirectionally predicted frames are called B-frames.

There are many possible GOP structures. A common GOP structure is 15 frames long, and has the sequence I_BB_P_BB_P_BB_P_BB_P_BB_. A similar 12-frame sequence is also common. I-frames encode for spatial redundancy, P and B-frames for both temporal redundancy and spatial redundancy. Because adjacent frames in a video stream are often well-correlated, P-frames and B-frames are only a small percentage of the size of I-frames. However, there is a trade-off between the size to which a frame can be compressed versus the processing time and resources required to encode such a compressed frame. The ratio of I, P and B-frames in the GOP structure is determined by the nature of the video stream and the bandwidth constraints on the output stream, although encoding time may also be an issue. This is particularly true in live transmission and in real-time environments with limited computing resources, as a stream containing many B-frames can take much longer to encode than an I-frame-only file.

B-frames and P-frames require fewer bits to store picture data, generally containing difference bits for the difference between the current frame and a previous frame, subsequent frame, or both. B-frames and P-frames are thus used to reduce redundancy information contained across frames. In operation, a decoder receives an encoded B-frame or encoded P-frame and uses a previous or subsequent frame to reconstruct the original frame. This process is much easier and produces smoother scene transitions when sequential frames are substantially similar, since the difference in the frames is small.

Each video image is separated into one luminance (Y) and two chrominance channels (also called color difference signals Cb and Cr). Blocks of the luminance and chrominance arrays are organized into "macroblocks," which are the basic unit of coding within a frame.

In the case of I-frames, the actual image data is passed through an encoding process. However, P-frames and B-frames are first subjected to a process of "motion compensation." Motion compensation is a way of describing the difference between consecutive frames in terms of where each macroblock of the former frame has moved. Such a technique is often employed to reduce temporal redundancy of a video sequence for video compression. Each macroblock in the P-frames or B-frame is associated with an area in the previous or next image that it is well-correlated, as selected by the encoder using a "motion vector." The motion vector that maps the macroblock to its correlated area is encoded, and then the difference between the two areas is passed through the encoding process.

Conventional video codecs use motion compensated prediction to efficiently encode a raw input video stream. The macroblock in the current frame is predicted from a displaced macroblock in the previous frame. The difference between the original macroblock and its prediction is compressed and transmitted along with the displacement (motion) vectors. This technique is referred to as inter-coding prediction, which is the approach used in the MPEG standards.

Within the H.264/AVC standard, macroblocks are encoded using a single transform algorithm, the discrete cosine transform (DCT), and a selected one of nine available intra-prediction algorithms. A mode selection algorithm is used to determine the best fit intra-prediction algorithm. The term "intra" refers to the fact that the various compression techniques are performed relative to data that is contained only within the current frame, and not relative to any other frame in the video sequence. In other words, no temporal processing is performed outside of the current picture or frame. Image data is received from an image data source. The coding process varies greatly depending on the type of encoder used, but the most common steps usually include: partitioning into macroblocks, transform, quantization, and entropy encoding.

FIG. 1 illustrates a schematic block diagram of an exemplary AVC-based encoder. The AVC-based encoder utilizes transform T, quantization Q, entropy coding E, and intra-prediction P to encode each macroblock. Although not included in FIG. 1, AVC-based encoders also utilize inter-frame prediction, also referred to as motion compensation. However, for purposes of this discussion, the AVC-based encoder is directed to intra-frame coding techniques. An image or frame to be encoded is partitioned into macroblocks, or blocks. Each block includes a set of pixels, for example a 4×4 block of pixels or an 8×8 block of pixels. The AVC-based encoder compresses the pixel data of each block using the intra-prediction P and the transform T. For each pixel block $x_i$, one of the known intra-predictions, $P_k$, is used to determine a predicted value $Pn_i$ for the pixel block $x_i$. In many applications, there are nine intra-predictions available. This predicted block $Pn_i$ is compared to the actual pixel block $x_i$. The difference between the actual value and the predicted value is referred to as the residual block $e_i$. The intra-prediction $P_k$ generates the predicted block $Pn_i$ based on similarities among the pixel block $x_i$ and the pixels adjacent to the pixel block $x_i$. Specifically, the pixel value in the pixel block $x_i$ is predicted using pre-coded adjacent pixel values, referred to as reconstructed neighborhood pixels $n_i$. A mode selection algorithm determines a best fit intra-prediction mode $P_k$ used to generate the predicted block $Pn_i$. To determine the best fit intra-prediction mode $P_k$, the mode selection algorithm applies each of the k available intra-predictions to generate k preliminary prediction results. Each of these k preliminary prediction results are compared using rate distortion measures to determine the best fit. The rate distortion measure is a linear combination of the number of bits for encoding the block and the sum of square of the difference between the original block and the encoded block as in the VCEG JM software codec and the VCEG KTA software codec. A best fit intra-prediction is determined for each pixel block.

The residual block $e_i$ is further compressed using the transform T. In the AVC-based encoder, the transform T uses the discrete cosine transform (DCT) to transform the residual block $e_i$ into its frequency components. In other words, the residual block $e_i$ is transformed from pixel data to frequency components. All information contained in the original residual block $e_i$ is preserved during transformation, and is therefore reversible, such as by the inverse transform V.

The transformed residual block is then quantized according to a defined quantization parameter (QP). The quantized results along with an identification of the intra-prediction $P_k$ are coded by entropy coder E. Exemplary entropy coding techniques include, but are not limited to, VLC (variable length coding), CAVLC (context-adaptive variable length coding), and CABAC (context-adaptive binary arithmetic coding). A best effort approximation of inverting the frequency components is performed by the inverse quantization $Q^{-1}$.

The K-Technical Area (KTA) expands on the H.264/AVC standard. In particular, the KTA includes a Mode Dependent Directional Transform (MDDT) where for each of the intra-predictions $P_k$, there is defined a corresponding transform $T_k$. In other words, for each of the intra-predictions $P_k$, there is a corresponding one transform $T_k$. For example, mode 1 refers to the pair of intra-prediction $P_1$ and the transform $T_1$. The intra-prediction/transform pairs for each mode k are used together. In contrast, the H.264/AVC standard specifies only a single transform used irrespective of the intra-prediction $P_k$. The method used in the KTA-MDDT to determine the best fit intra-prediction $P_k$ is the same as the H.264/AVC standard. As each intra-prediction and transform pair are previously known and defined, once the best-fit intra-prediction $P_k$ is determined, the transform $T_k$ previously associated with the intra-prediction $P_k$ is automatically known.

SUMMARY OF THE INVENTION

A joint optimization iterative algorithm determines optimized mode pairs. Each mode pair includes an intra-predictor and a transform pair that are iteratively modified to determine an optimized intra-predictor and an optimized transform that forms the optimized mode pair. A set of training videos and a set of quantization parameters (QPs) are used as the base data for determining the optimized mode pairs. Each video includes a plurality of pixel blocks, herein referred to as blocks. Block statistics associated with each mode pair are accumulated by separately encoding each block using each mode pair, and selecting the best mode pair for each block according to a measured characteristic of each encoding. The accumulated block statistics are used to modify the intra-predictor and the transform within each mode pair.

In one aspect, a method of determining an optimized intra-prediction mode and transform mode is disclosed. The method includes receiving one or more training videos; initializing each of a plurality of mode pairs, each mode pair includes an intra-predictor and a transform; encoding the one or more training videos using the plurality of mode pairs; accumulating statistics corresponding to the encoded one or more training videos; and modifying the intra-predictor and the transform within each mode pair according to the accumulated statistics, thereby forming a plurality of modified mode pairs. The method can also include encoding the one or more training videos using the plurality of modified mode pairs; measuring a performance of the encoding using the plurality of modified mode pairs; and comparing the measured performance to a predetermined value, and if the measured performance is greater than the predetermined value, then accumulating statistics and modifying the intra-predictor and the transform are repeated. The method can also include encoding the one or more training videos using the plurality of modified mode pairs; and repeating accumulating statistics corresponding to the encoded one or more training videos and modifying the intra-predictor and the transform within each mode pair according to the accumulated statistics for a predetermined number of iterations. The method can also include receiving one or more quantization parameters; and separately encoding each of the one or more training videos using each mode pair and each quantization parameter such that the characteristic is generated for each encoding of each of the one or more training videos using one of the mode pairs and one of the quantization parameters.

In another aspect, a method of determining an optimized intra-predictor and optimized transform pair is disclosed. The method includes receiving one or more training videos; partitioning each training video into pixel blocks; initializing each of a plurality of mode pairs, each mode pair includes an intra-predictor and a transform; for each pixel block, separately encoding the pixel block using each mode pair such that for each mode pair encoding of the pixel block a characteristic is generated; for each pixel block, measuring the characteristic of the encoded pixel block for each mode pair encoding; for each pixel block, classifying the pixel block according to the mode pair having the characteristic that is closest to a defined criteria such that the pixel block is associated with a specific classification and the specific classification is associated with a specific mode pair; determining block statistics for each pixel block; accumulating block statistics according to classification; modifying the intra-predictor and the transform of each mode pair using the block statistics accumulated for each classification, thereby forming modified mode pairs; encoding each of the one or more training videos using the modified mode pairs and measuring a performance of the encoding; and comparing the measured performance to a predetermined value, and if the measured performance is greater than the predetermined value, then separately encoding the pixel blocks, measuring the characteristic, classifying the pixel blocks, determining block statistics, accumulating block statistics, modifying the intra-predictor and the transform, encoding each of the one or more training videos, and comparing the measured performance are repeated using the modified mode pairs.

The method can also include receiving one or more quantization parameters, and separately encoding the pixel block using each mode pair can include separately encoding the pixel block using each mode pair and each quantization parameter such that the characteristic is generated for each encoding of the pixel block using one of the mode pairs and one of the quantization parameters. Measuring the performance can include measuring a rate-distortion performance of the one or more training videos. Measuring the characteristic of the encoded pixel block can include measuring a rate-distortion cost of the encoded pixel block. The predetermined value can be a measured performance from an immediate preceding iteration minus a threshold value. The statistics for each pixel block can include a current classification of the pixel block, pixel data corresponding to the pixel block, and a reconstructed neighborhood pixel data neighboring the pixel block. The plurality of mode pairs can be initialized according to the H.264/AVC standard. Each intra-predictor can include intra-predictor coefficients and each transform can include transform coefficients, and modifying the intra-predictor and the transform of each mode pair using the block statistics accumulated for each classification can include modifying one or more of the intra-predictor coefficients and one or more of the transform coefficients.

In another aspect, a method of determining an optimized intra-predictor and optimized transform pair is disclosed. The method includes receiving one or more training videos; partitioning each training video into pixel blocks; initializing each of a plurality of mode pairs, each mode pair includes an intra-predictor and a transform; for each pixel block, separately encoding the pixel block using each mode pair such that for each mode pair encoding of the pixel block a characteristic is generated; for each pixel block, measuring the characteristic of the encoded pixel block for each mode pair encoding; for each pixel block, classifying the pixel block according to the mode pair having the characteristic that is closest to a defined criteria such that the pixel block is associated with a specific classification and the specific classification is associated with a specific mode pair; determining block statistics for each pixel block; accumulating block statistics according to classification; modifying the intra-predictor and the transform of each mode pair using the block statistics accumulated for each classification, thereby forming modified mode pairs; and repeating separately encoding the pixel blocks, measuring the characteristic, classifying the pixel blocks, determining block statistics, accumulating block statistics, and modifying the intra-predictor and the transform for a predetermined number of iterations.

In yet another aspect, a computing device is disclosed. The computing device includes a memory for storing one or more training videos and a plurality of mode pairs; and a processing module configured to perform an iterative algorithm. The iterative algorithm includes initializing each of the plurality of mode pairs, each mode pair includes an intra-predictor and a transform; encoding the one or more training videos using the plurality of mode pairs; accumulating statistics corresponding to the encoded one or more training videos; and modifying the intra-predictor and the transform within each mode pair according to the accumulated statistics, thereby forming a plurality of modified mode pairs.

The processing module can include an iterative mode selection module configured to determine the mode pair used to encode each pixel block within each of the one or more training videos. The iterative algorithm can also include encoding the one or more training videos using the plurality of modified mode pairs; measuring a performance of the encoding using the plurality of modified mode pairs; and comparing the measured performance to a predetermined value, and if the measured performance is greater than the predetermined value, then accumulating statistics and modifying the intra-predictor and the transform are repeated. The iterative algorithm can also include encoding the one or more training videos using the plurality of modified mode pairs; and repeating accumulating statistics corresponding to the encoded one or more training videos and modifying the intra-predictor and the transform within each mode pair according to the accumulated statistics for a predetermined number of iterations. The memory can be further configured to store one or more quantization parameters, and the iterative algorithm can also include separately encoding each of the one or more training videos using each mode pair and each quantization parameter such that the characteristic is generated for each encoding of each of the one or more training videos using one of the mode pairs and one of the quantization parameters. The statistics can be associated with each pixel block in the one or more training videos and the statistics can include a current classification of the pixel block, the pixel data corresponding to the pixel block, and a reconstructed neighborhood pixel data neighboring the pixel block. The plurality of mode pairs can be initialized according to the H.264/AVC standard.

BRIEF DESCRIPTION OF THE DRAWINGS

Embodiments of the joint optimization iterative algorithm are described relative to the several views of the drawings. Where appropriate and only where identical elements are disclosed and shown in more than one drawing, the same reference numeral will be used to represent such identical elements.

DETAILED DESCRIPTION OF THE EMBODIMENTS

Figure 1:
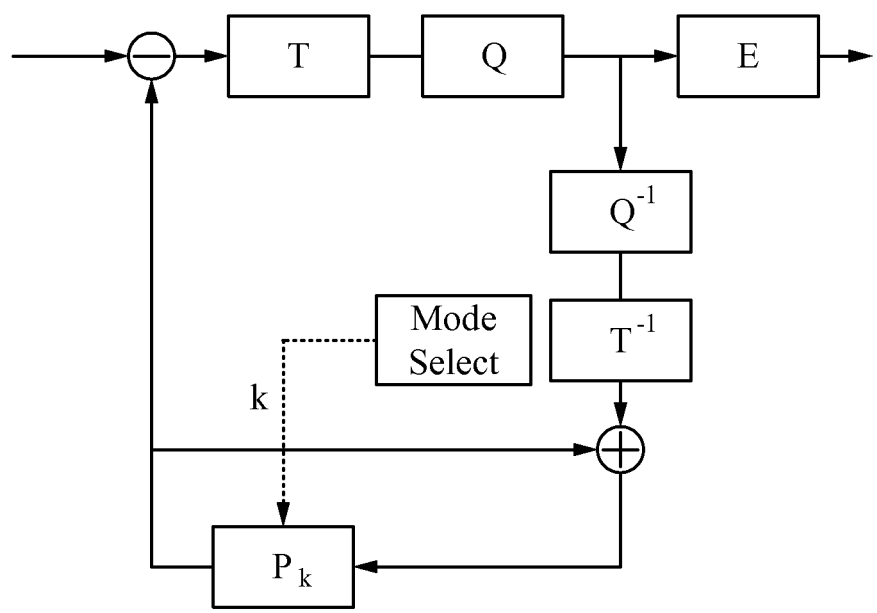
FIG. 1 illustrates a schematic block diagram of an exemplary AVC-based encoder.

Embodiments of the present application are directed to a joint optimization iterative algorithm. Those of ordinary skill in the art will realize that the following detailed description of the joint optimization iterative algorithm is illustrative only and is not intended to be in any way limiting. Other embodiments of the joint optimization iterative algorithm will readily suggest themselves to such skilled persons having the benefit of this disclosure.

Reference will now be made in detail to implementations of the joint optimization iterative algorithm as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

A joint optimization iterative algorithm determines optimized mode pairs for use in video compression applications. Each mode pair includes an intra-predictor and a transform pair that are iteratively modified to determine an optimized intra-predictor and an optimized transform that forms the optimized mode pair. A set of training videos and a set of quantization parameters (QPs) are used as the base data for determining the optimized mode pairs. Each video includes a plurality of pixel blocks, herein referred to as blocks. A series of iterations is performed to accumulate block statistics associated with each mode pair, which are used to modify the intra-predictor and transform in each mode pair to form a modified mode pair. The block statistics are accumulated by separately encoding each block using each mode pair, and selecting the best mode pair for each block according to a measured characteristic of each encoding. The modified mode pairs are then used to encode the set of training videos for each of the set of QPs to determine an average performance of the modified mode pairs. The entire process is then repeated using the modified mode pairs instead of the initialized mode pairs. In the subsequent iteration, the modified mode pairs are again modified to form second modified mode pairs. The average performance of the second modified mode pairs is measured and compared to the average performance from the previous iteration, using the modified mode pairs. This process is repeated until the difference between the average performance in subsequent iterations is equal to or less than a predetermined value, at which point the mode pairs are considered optimized.

Figure 2A:
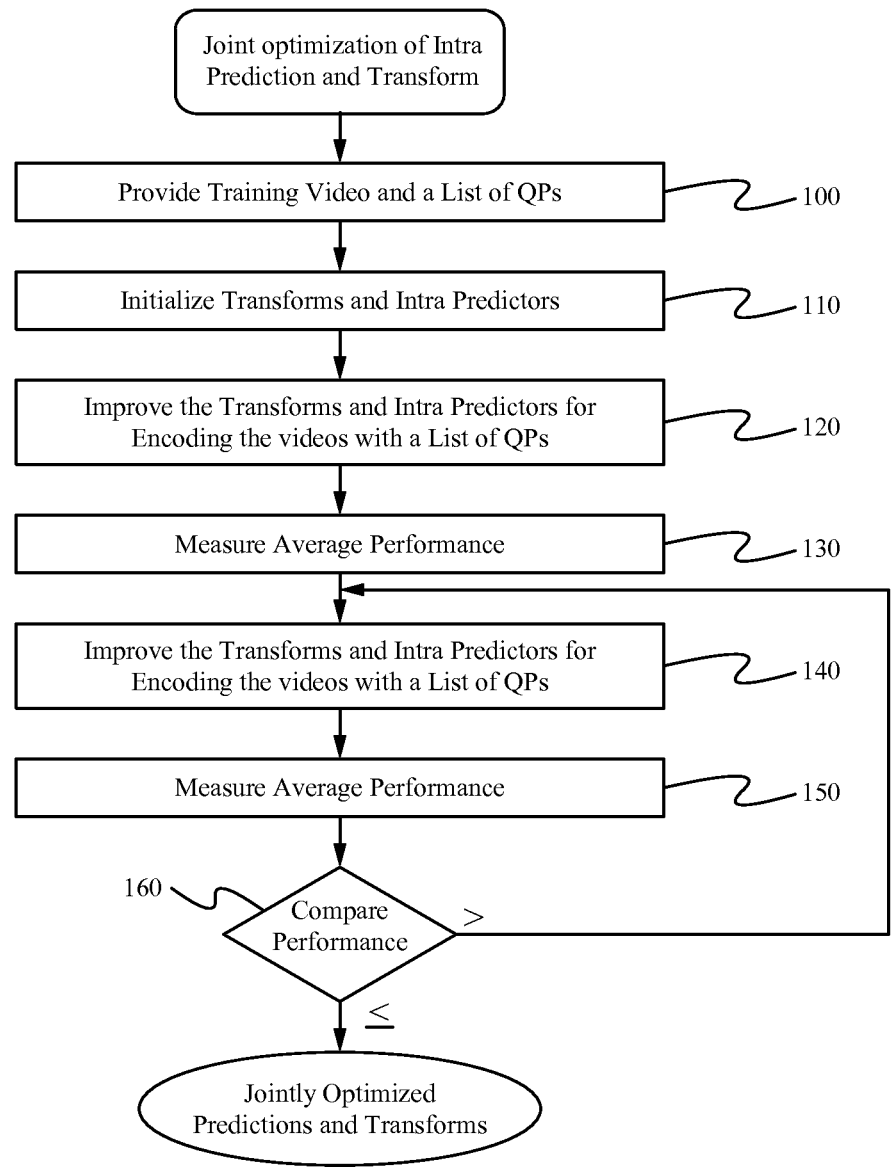
FIG. 2A illustrates a joint optimization iterative algorithm for determining optimized mode pairs.
Figure 3:
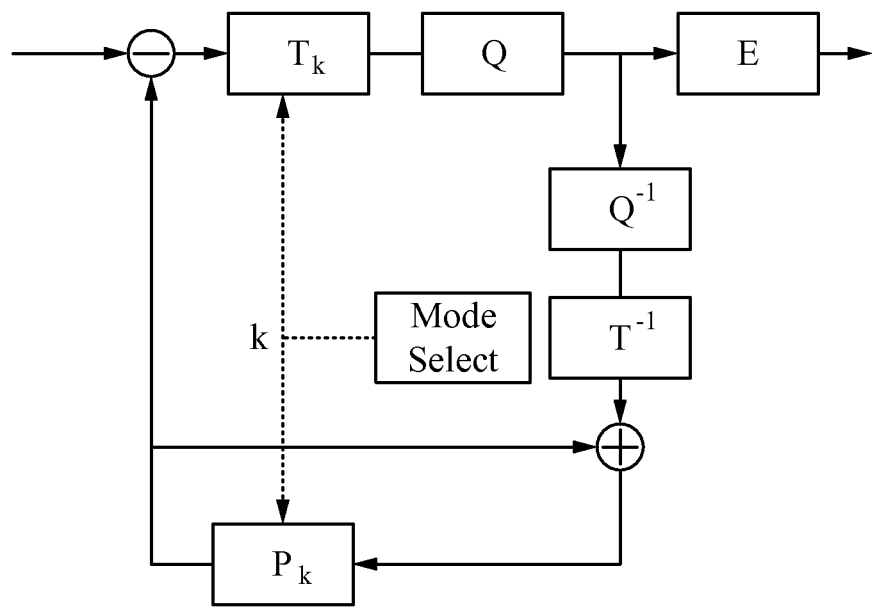
FIG. 3 illustrates a schematic block diagram of an exemplary encoder configured to utilize the joint optimization iterative algorithm.

FIG. 2A illustrates a joint optimization iterative algorithm for determining optimized mode pairs. Each optimized mode pair includes an optimized intra-predictor and an optimized transform. FIG. 3 illustrates a schematic block diagram of an exemplary encoder configured to implement the joint optimization iterative algorithm. The encoder utilizes transform T, quantization Q, entropy coding E, inverse transform $T^{-1}$, inverse quantization $Q^{-1}$, and intra-prediction P.

At the step 100, one or more training videos and a list of quantization parameters (QPs) are provided. In some embodiments, 4 QPs are provided. The joint optimization iterative algorithm optimizes the intra-predictor and the transform for each mode pair. Using multiple QPs to optimize each mode pair enables the optimize mode pairs to be substantially independent of a specific QP or QPs used by a particular encoder. At the step 110, the intra predictors and the transforms are initialized. In some embodiments, the intra-predictors and the transforms are initialized according to the KTA standard such that K intra-predictors and K transforms are initialized and associated as k mode pairs, each mode pair K including an intra-predictor $P_k$ and a transform $T_k$.

Figure 2B:
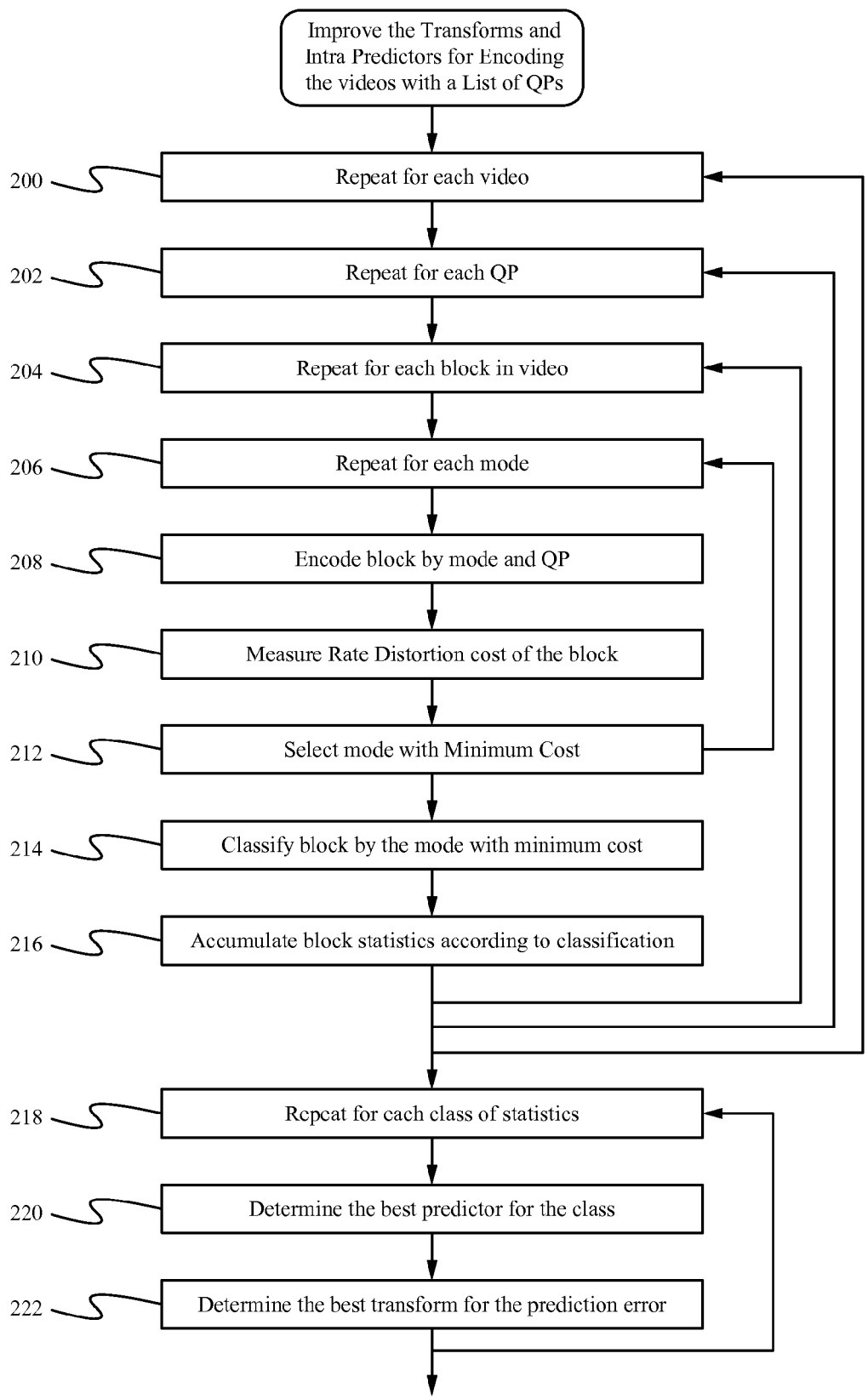
FIG. 2B illustrates the step of improving the intra-predictors and transforms from the joint optimization iterative algorithm of FIG. 2A.

Each frame within each training video is partitioned into pixel blocks. The joint optimization iterative algorithm includes multiple iterations N. For each iteration, a series of steps is performed for each training video, for each QP, for each block within each training video, and for each mode pair. During a first iteration, N=1, a first such series of steps is performed, represented as the step 120. FIG. 2B illustrates an embodiment of a series of steps corresponding to the step 120. The series of steps shown in FIG. 2B is configured to improve the intra-predictors and transforms used for encoding the training videos with a list of QPs.

At the step 200, a first training video is selected from the one or more training videos provided at the step 100. At the step 202, a first QP is selected from the list of QPs provided at the step 100. At the step 204, a first block is selected from the first training video selected at the step 200. At the step 206, a first mode pair, mode pair 1, is selected from the K mode pairs initialized at the step 110. The mode pair 1 includes initialized intra-predictor 1 and initialized transform 1. At the step 208, the first block is encoded using the mode pair 1 selected at the step 206 and the first QP selected at the step 202. At the step 210, a characteristic of the encoded first block is measured. In some embodiments, the measured characteristic is a rate distortion cost of the encoded first block.

At the step 212, the first block is associated with the mode pair K best defined by the characteristic measured in the step 210. In some embodiments, the best defined mode pair K is the mode pair having the lowest rate distortion cost. In general, the best defined mode pair K is the mode pair that best matches one or more defined parameters that evaluates the measured characteristic. In the case where the first block is encoded using the mode pair 1 and the first QP, the best defined mode pair K is the mode pair 1, since this is the first iteration through the loop defined by steps 206-212. During subsequent iterations through the steps 206-212, the first block is encoded using each of the mode pairs K, the rate distortion cost of each encoding is measured and the mode pair having the lowest rate distortion cost is determined. At the step 214, the first block is classified by the mode pair with the lowest rate distortion cost, as determined by the loop of steps 206-212. In the case of K mode pairs, there are K classifications. At the step 216, block statistics for the first block are accumulated, where the block statistics for the first block are generated according to the first block classification. In other words, the block statistics for the first block are generated according to the encoding of the first block using the mode pair with the lowest rate distortion cost. In some embodiments, the block statistics include the classification of the first block, the pixels included in the first block, and the reconstructed neighborhood pixels of the first block.

After the block statistics for the first block are accumulated at the step 216, the process loops back to the step 204 where a second block of the first training video is selected. The steps 206-216 are repeated for the second block of the first training video and the first QP similarly as for the first block and the first QP in order to determine for the second block the mode pair K having the lowest rate distortion cost, and to accumulate the block statistics for the second block. The steps 204-216 are repeated for each block in the first training video, using the first QP. Once block statistics associated with all of the blocks in the first training video are determined using the first QP, the process loops back to the step 202 where a second QP is selected from the list of QPs provided at the step 100. The steps 204-216 are then repeated for all blocks in the first training video using the second QP. The process steps 202-216 are repeated for each QP in the list of QPs applied to the first training video. Once the block statistics have been collected from all blocks in the first training video using all of the QPs in the list of QPs, the process loops back to the step 200 where a second training video, if applicable, is selected from the one or more training videos provided at the step 100. The steps 202-216 are then repeated for all blocks in the second training video using all of the QPs in the list of QPs, while accumulating the block statistics.

At the conclusion of the steps 200-216, each classification K has a compilation of block statistics accumulated from each block having been classified by the mode pair K. For example, if block 1 from the first training video using QP 1, block 10 from the first training video using QP 2, and block 15 from the second training video using QP 3 are all classified as classification 1 because the mode pair 1 was determined as the mode pair having the lowest rate distortion cost for a specific QP, then classification 1 includes the block statistics associated with block 1 from the first training video using QP 1, block 10 from the first training video using QP 2, and block 15 from the second training video using QP 3.

The loop including step 218-222 modifies the intra-predictor and the transform of the mode pair K associated with each classification K. At the step 218, classification 1 is selected from the K classifications. At the step 220, the intra-predictor 1 of the mode pair 1 associated with classification 1 is modified to intra-predictor 1' according to the block statistics accumulated for the classification 1. The modified intra-predictor 1' is a linear predictor. It predicts the pixel value of block from its reconstructed neighborhood pixels by a linear transformation of the neighborhood of the block. It is obtained by the ordinary least square method which minimizes the sum of square prediction error among all the blocks with classification 1. After the modified intra predictor 1' is determined, prediction error of the modified intra predictor 1' applied to the blocks with classification 1 is computed.

At the step 222, the transform 1 of the mode pair 1 associated with classification 1 is computed as the Karhunen-Loéve transform of the prediction error computed at step 220.

After the intra-predictor and the transform of mode pair 1 associated with classification 1 are modified, the process loops back to the step 218 where classification 2 is selected. Steps 220 and 222 are repeated for classification 2 to modify the intra-predictor 2 and the transform 2 of mode pair 2 associated with classification 2. The steps 218-222 are repeated for each classification K to determine modified mode pairs K.

Referring to FIG. 2A, at the step 130, an average performance of the modified mode pairs K, determined at the step 120, is measured. Each of the one or more training videos is separately encoded using each QP in the list of QPs provided at the step 100. For example, training video 1 is first encoded using QP 1 and the modified mode pairs K, then training video 1 is encoded using QP 2 and the modified mode pairs K, and so on for each QP and for each training video. The performance of each encoding is summed to measure the average performance. In some embodiments, the performance is measured as the average rate and the average PSNR (Peak Signal-to-Noise Ratio) for encoding each training video at each of the QPs, such as the 4 QPs. In the case of 4 QPs, 4 average rates and 4 PSNRs are collected for each sequence.

Figure 4:
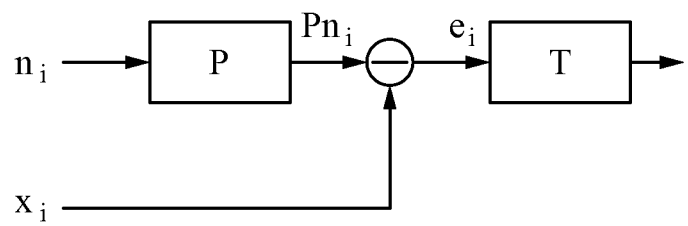
FIG. 4 illustrates a relationship between the actual pixel block value, the predicted value, and the residual.

When encoding a video using mode pairs K, the best-fit intra-predictor $P_k$ applied to each block is the intra-predictor that results in the least amount of cost for encoding prediction error, or residual. Example costs for encoding includes L2 norm, L1 norm, or the rate-distortion cost used in the AVC JM encoder. The residual is the difference between the actual value of a pixel block $x_i$ and the predicted value $Pn_j$ of the pixel block $x_i$ using the intra-predictor $P_k$ and the reconstructed neighborhood pixels $n_j$. FIG. 4 illustrates this relationship where the residual $e_i$ is the difference between the actual pixel block value $x_i$ and the predicted value $Pn_j$. The best-fit transform $T_k$ is that transform paired with the best-fit intra-predictor $P_k$.

After the average performance is measured at the step 130, the first iteration of modifying the intra-predictors and transforms for each mode pair is completed.

During each subsequent iteration, N>1, the steps 140-160 are performed. The step 140 is functionally equivalent to the step 120, and the step 150 is functionally equivalent to the step 130. During a second iteration, N=2, the modified mode pairs K determined during the first iteration, N=1, are used. Specifically, the modified mode pairs K from iteration N=1 are applied to each of the one or more training videos using each of the QPs in the list of QPs to accumulate block statistics for each classification K. Depending on the mode pair selected during the steps 206-212 of the second iteration N=2, each block may or may not be classified the same as during the previous iteration. The accumulated block statistics from the iteration N=2 are used to again modify the modified intra-predictor and transform mode pairs from the first iteration N=1. After the step 140 in the second iteration N=2, each mode pair K includes intra-predictor K modified for a second time and transform K modified for a second time.

At the step 150, an average performance of the modified mode pairs K, modified during the second iteration N=2 at the step 140, is measured. At the step 160, the average performance of the mode pairs K modified during the second iteration N=2 is compared to the average performance of the mode pairs K modified during the first iteration N=1. In some embodiments, the average performance is compared by the average of the BD-Rate of the training videos, where the BD-Rate is computed from the average rate and PSNR of each training video encoded at each QP, such as the 4 QPs, as specified in ITU-T SG16/Q6 Doc VCEG-AI11. If the difference between the average performances of the successive iterations is equal to or less than a predetermined threshold value, then the intra-predictors and the transforms are considered optimized. The modified intra-predictors and modified transforms of the modified mode pairs K can then be used within a video compression application. If the difference between the average performances of the successive iterations is greater than the predetermined threshold value, then another iteration is performed and the steps 130-150 are repeated to modify the mode pairs K from the previous iteration.

In an alternative embodiment, the average performance for each iteration is not calculated and used as a basis for continued iterations. Instead, the iterative algorithm is performed for a predetermined number of iterations.

Once the joint optimization iterative algorithm is completed, the data processing algorithm is applied according to the classification and the optimized parameter values corresponding to each classification.

Figure 5:
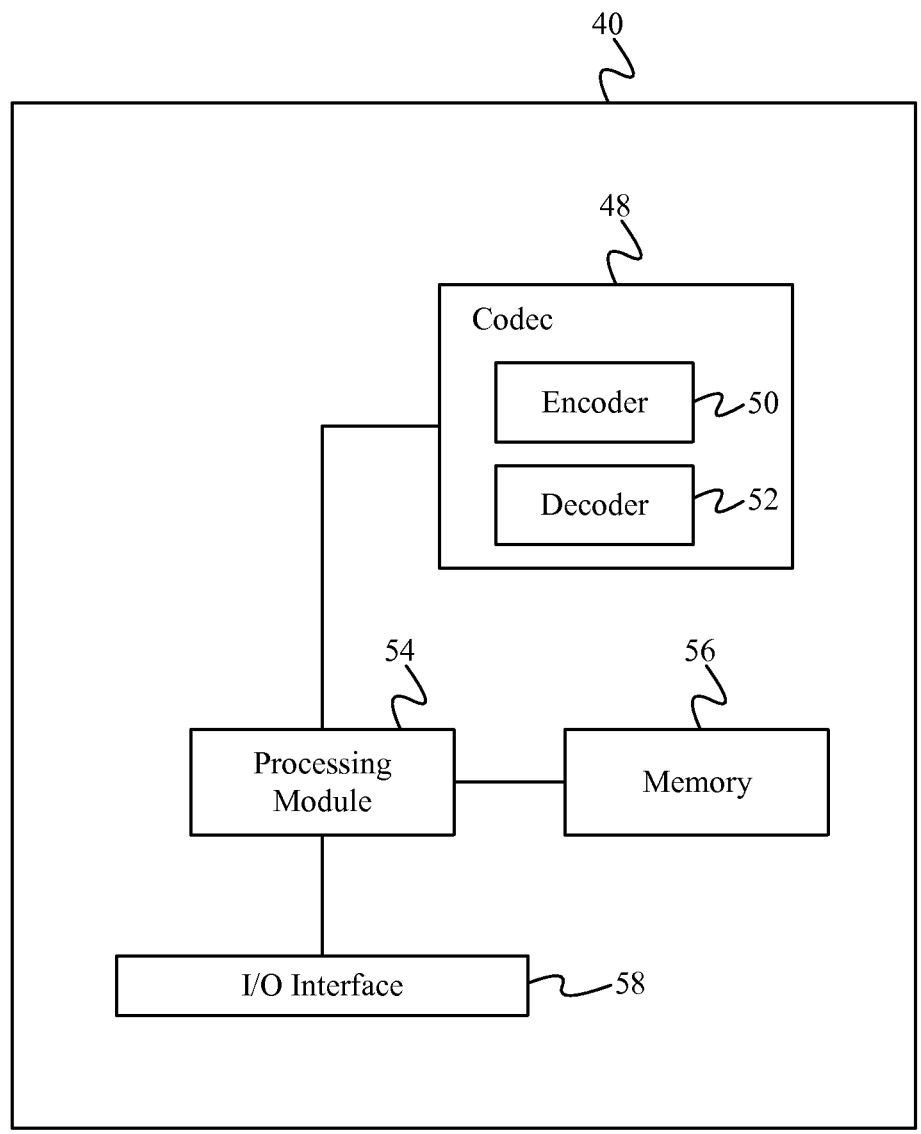
FIG. 5 illustrates a block diagram of an exemplary imaging device configured to operate the joint optimization iterative algorithm.

FIG. 5 illustrates a block diagram of an exemplary computing device configured to operate the joint optimization iterative algorithm. The computing device 40 includes a codec 48, a processing module 54, a memory 56, and an input/output (I/O) interface 58. The I/O interface 58 includes a user interface and a network interface for transmitting and receiving data such as the training videos and the list of QPs. The memory 56 is any conventional type of data storage medium, either integrated or removable. The codec 48 includes an encoder 50, such as that shown in the FIG. 3, and a decoder 52. The choice of processor is not critical as long as a suitable processor with sufficient speed is chosen. The memory 56 is able to be any conventional computer memory known in the art including, but not limited to, a hard drive, CDROM, CDRW, DVD, DVDRW, flash memory card or any other storage device. An example of a network interface includes a network card connected to an Ethernet or other type of LAN. The user interface can include one or more of the following: keyboard, mouse, monitor, display, printer, modem, touchscreen, button interface and other devices. In some embodiments, the joint optimization iterative algorithm is stored in memory 56 and precessed by the processing module 54 as applications are typically processed. More or less components than those shown in FIG. 5 are able to be included in the imaging device 40.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

Some Embodiments of a Method to Determining an Optimized Intra-Prediction Mode and Transform Mode 1. A method of determining an optimized intra-predictor and optimized transform pair comprising:
   a. receiving one or more training videos;
   b. initializing each of a plurality of mode pairs, each mode pair includes an intra-predictor and a transform;
   c. encoding the one or more training videos using the plurality of mode pairs;
   d. accumulating statistics corresponding to the encoded one or more training videos; and
   e. modifying the intra-predictor and the transform within each mode pair according to the accumulated statistics, thereby forming a plurality of modified mode pairs.

2. The method of clause 1 further comprising;
   a. encoding the one or more training videos using the plurality of modified mode pairs;
   b. measuring a performance of the encoding using the plurality of modified mode pairs; and
   c. comparing the measured performance to a predetermined value, and if the measured performance is greater than the predetermined value, then accumulating statistics and modifying the intra-predictor and the transform are repeated.

3. The method of clause 1 further comprising:
   a. encoding the one or more training videos using the plurality of modified mode pairs;

b. repeating accumulating statistics corresponding to the encoded one or more training videos and modifying the intra-predictor and the transform within each mode pair according to the accumulated statistics for a predetermined number of iterations.

4. The method of clause 1 further comprising:
   a. receiving one or more quantization parameters; and
   b. separately encoding each of the one or more training videos using each mode pair and each quantization parameter such that the characteristic is generated for each encoding of each of the one or more training videos using one of the mode pairs and one of the quantization parameters.

5. A method of determining an optimized intra-predictor and optimized transform pair comprising:
   a. receiving one or more training videos;
   b. partitioning each training video into pixel blocks;
   c. initializing each of a plurality of mode pairs, each mode pair includes an intra-predictor and a transform;
   d. for each pixel block, separately encoding the pixel block using each mode pair such that for each mode pair encoding of the pixel block a characteristic is generated;
   e. for each pixel block, measuring the characteristic of the encoded pixel block for each mode pair encoding;
   f. for each pixel block, classifying the pixel block according to the mode pair having the characteristic that is closest to a defined criteria such that the pixel block is associated with a specific classification and the specific classification is associated with a specific mode pair;
   g. determining block statistics for each pixel block;
   h. accumulating block statistics according to classification;
   i. modifying the intra-predictor and the transform of each mode pair using the block statistics accumulated for each classification, thereby forming modified mode pairs;
   j. encoding each of the one or more training videos using the modified mode pairs and measuring a performance of the encoding; and
   k. comparing the measured performance to a predetermined value, and if the measured performance is greater than the predetermined value, then separately encoding the pixel blocks, measuring the characteristic, classifying the pixel blocks, determining block statistics, accumulating block statistics, modifying the intra-predictor and the transform, encoding each of the one or more training videos, and comparing the measured performance are repeated using the modified mode pairs.

6. The method of clause 5 further comprises receiving one or more quantization parameters, and separately encoding the pixel block using each mode pair comprises separately encoding the pixel block using each mode pair and each quantization parameter such that the characteristic is generated for each encoding of the pixel block using one of the mode pairs and one of the quantization parameters.

7. The method of clause 5 wherein measuring the performance comprises measuring a rate-distortion performance of the one or more training videos.

8. The method of clause 5 wherein measuring the characteristic of the encoded pixel block comprises measuring a rate-distortion cost of the encoded pixel block.

9. The method of clause 5 wherein the predetermined value is a measured performance from an immediate preceding iteration minus a threshold value.

10. The method of clause 5 wherein the statistics for each pixel block include a current classification of the pixel block, pixel data corresponding to the pixel block, and a reconstructed neighborhood pixel data neighboring the pixel block.

11. The method of clause 5 wherein the plurality of mode pairs are initialized according to the H.264/AVC standard.

12. The method of clause 5 wherein each intra-predictor includes intra-predictor coefficients and each transform includes transform coefficients, and modifying the intra-predictor and the transform of each mode pair using the block statistics accumulated for each classification comprises modifying one or more of the intra-predictor coefficients and one or more of the transform coefficients.

13. A method of determining an optimized intra-predictor and optimized transform pair comprising:
   a. receiving one or more training videos;
   b. partitioning each training video into pixel blocks;
   c. initializing each of a plurality of mode pairs, each mode pair includes an intra-predictor and a transform;
   d. for each pixel block, separately encoding the pixel block using each mode pair such that for each mode pair encoding of the pixel block a characteristic is generated;
   e. for each pixel block, measuring the characteristic of the encoded pixel block for each mode pair encoding;
   f. for each pixel block, classifying the pixel block according to the mode pair having the characteristic that is closest to a defined criteria such that the pixel block is associated with a specific classification and the specific classification is associated with a specific mode pair;
   g. determining block statistics for each pixel block;
   h. accumulating block statistics according to classification;
   i. modifying the intra-predictor and the transform of each mode pair using the block statistics accumulated for each classification, thereby forming modified mode pairs; and
   j. repeating separately encoding the pixel blocks, measuring the characteristic, classifying the pixel blocks, determining block statistics, accumulating block statistics, and modifying the intra-predictor and the transform for a predetermined number of iterations.

14. The method of clause 13 further comprises receiving one or more quantization parameters, and separately encoding the pixel block using each mode pair comprises separately encoding the pixel block using each mode pair and each quantization parameter such that the characteristic is generated for each encoding of the pixel block using one of the mode pairs and one of the quantization parameters.

15. The method of clause 13 wherein the statistics for each pixel block include a current classification of the pixel block, pixel data corresponding to the pixel block, and a reconstructed neighborhood pixel data neighboring the pixel block.

16. The method of clause 13 wherein the plurality of mode pairs are initialized according to the H.264/AVC standard.

17. The method of clause 13 wherein each intra-predictor includes intra predictor coefficients and each transform includes transform coefficients, and modifying the intra-predictor and the transform of each mode pair using the block statistics accumulated for each classification comprises modifying one or more of the intra-predictor coefficients and one or more of the transform coefficients.

18. A computing device comprising:
   a. a memory for storing one or more training videos and a plurality of mode pairs; and
   b. a processing module configured to perform an iterative algorithm comprising:
      i. initializing each of the plurality of mode pairs, each mode pair includes an intra-predictor and a transform;

ii. encoding the one or more training videos using the plurality of mode pairs;
iii. accumulating statistics corresponding to the encoded one or more training videos; and
iv. modifying the intra-predictor and the transform within each mode pair according to the accumulated statistics, thereby forming a plurality of modified mode pairs.

19. The computing device of clause 18 wherein the processing module includes an iterative mode selection module configured to determine the mode pair used to encode each pixel block within each of the one or more training videos.

20. The computing device of clause 18 wherein the iterative algorithm further comprises;
   a. encoding the one or more training videos using the plurality of modified mode pairs;
   b. measuring a performance of the encoding using the plurality of modified mode pairs; and
   c. comparing the measured performance to a predetermined value, and if the measured performance is greater than the predetermined value, then accumulating statistics and modifying the intra-predictor and the transform are repeated.

21. The computing device of clause 18 wherein the iterative algorithm further comprises;
   a. encoding the one or more training videos using the plurality of modified mode pairs;
   b. repeating accumulating statistics corresponding to the encoded one or more training videos and modifying the intra-predictor and the transform within each mode pair according to the accumulated statistics for a predetermined number of iterations.

22. The computing device of clause 18 wherein the memory is further configured to store one or more quantization parameters, and the iterative algorithm further comprises separately encoding each of the one or more training videos using each mode pair and each quantization parameter such that the characteristic is generated for each encoding of each of the one or more training videos using one of the mode pairs and one of the quantization parameters.

23. The computing device of clause 18 wherein the statistics are associated with each pixel block in the one or more training videos and the statistics include a current classification of the pixel block, the pixel data corresponding to the pixel block, and a reconstructed neighborhood pixel data neighboring the pixel block.

24. The computing device of clause 11 wherein the plurality of mode pairs are initialized according to the H.264/AVC standard.

The joint optimization iterative algorithm has been described in terms of specific embodiments incorporating details to facilitate the understanding of the principles of construction and operation of the joint optimization iterative algorithm. Such references, herein, to specific embodiments and details thereof are not intended to limit the scope of the claims appended hereto. It will be apparent to those skilled in the art that modifications can be made in the embodiments chosen for illustration without departing from the spirit and scope of the joint optimization iterative algorithm.

What is claimed is:

1. A method of determining an optimized intra-predictor and optimized transform pair comprising:
   a. receiving one or more training videos;
   b. initializing each of a plurality of mode pairs, each mode pair of the mode pairs includes an intra-predictor and a transform, wherein the transforms of at least two of the plurality of mode pairs are different;
   c. encoding the one or more training videos using the plurality of mode pairs;
   d. accumulating statistics corresponding to the encoded one or more training videos; and
   e. modifying the intra-predictor and the transform within each mode pair according to the accumulated statistics, thereby forming a plurality of modified mode pairs, wherein the plurality of modified mode pairs are modified at least one additional time to generate a plurality of additional modified mode pairs, wherein an average performance of the plurality of additional modified mode pairs is measured and compared to the average performance from a previous iteration.

2. The method of claim 1 further comprising;
   a. encoding the one or more training videos using the plurality of modified mode pairs;
   b. measuring a performance of the encoding using the plurality of modified mode pairs; and
   c. comparing the measured performance to a predetermined value, and if the measured performance is greater than the predetermined value, then accumulating statistics and modifying the intra-predictor and the transform are repeated.

3. The method of claim 1 further comprising:
   a. encoding the one or more training videos using the plurality of modified mode pairs; and
   b. repeating accumulating statistics corresponding to the encoded one or more training videos and modifying the intra-predictor and the transform within each mode pair according to the accumulated statistics for a predetermined number of iterations.

4. The method of claim 1 further comprising:
   a. receiving one or more quantization parameters; and
   b. separately encoding each of the one or more training videos using each mode pair and each quantization parameter such that the characteristic is generated for each encoding of each of the one or more training videos using one of the mode pairs and one of the quantization parameters.

5. A method of determining an optimized intra-predictor and optimized transform pair comprising:
   a. receiving one or more training videos;
   b. partitioning each training video into pixel blocks;
   c. initializing each of a plurality of mode pairs, each mode pair of the mode pairs includes an intra-predictor and a transform, wherein the transforms of at least two of the plurality of mode pairs are different;
   d. for each pixel block, separately encoding the pixel block using each mode pair such that for each mode pair encoding of the pixel block a characteristic is generated;
   e. for each pixel block, measuring the characteristic of the encoded pixel block for each mode pair encoding;
   f. for each pixel block, classifying the pixel block according to the mode pair having the characteristic that is closest to a defined criteria such that the pixel block is associated with a specific classification and the specific classification is associated with a specific mode pair;
   g. determining block statistics for each pixel block;
   h. accumulating block statistics according to classification;
   i. modifying the intra-predictor and the transform of each mode pair using the block statistics accumulated for each classification, thereby forming modified mode pairs;
   j. encoding each of the one or more training videos using the modified mode pairs and measuring a performance of the encoding; and k. comparing the measured performance to a predetermined value, and if the measured performance is greater than the predetermined value, then separately encoding the pixel blocks, measuring the characteristic, classifying the pixel blocks, determining block statistics, accumulating block statistics, modifying the intra-predictor and the transform, encoding each of the one or more training videos, and comparing the measured performance are repeated using the modified mode pairs, wherein the modified mode pairs are modified at least one additional time to generate additional modified mode pairs, wherein an average performance of the additional modified mode pairs is measured and compared to the average performance from a previous iteration.

6. The method of claim 5 further comprises receiving one or more quantization parameters, and separately encoding the pixel block using each mode pair comprises separately encoding the pixel block using each mode pair and each quantization parameter such that the characteristic is generated for each encoding of the pixel block using one of the mode pairs and one of the quantization parameters.

7. The method of claim 5 wherein measuring the performance comprises measuring a rate-distortion performance of the one or more training videos.

8. The method of claim 5 wherein measuring the characteristic of the encoded pixel block comprises measuring a rate-distortion cost of the encoded pixel block.

9. The method of claim 5 wherein the predetermined value is a measured performance from an immediate preceding iteration minus a threshold value.

10. The method of claim 5 wherein the statistics for each pixel block include a current classification of the pixel block, pixel data corresponding to the pixel block, and a reconstructed neighborhood pixel data neighboring the pixel block.

11. The method of claim 5 wherein the plurality of mode pairs are initialized according to the H.264/AVC standard.

12. The method of claim 5 wherein each intra-predictor includes intra-predictor coefficients and each transform includes transform coefficients, and modifying the intra-predictor and the transform of each mode pair using the block statistics accumulated for each classification comprises modifying one or more of the intra-predictor coefficients and one or more of the transform coefficients.

13. A method of determining an optimized intra-predictor and optimized transform pair comprising:
    a. receiving one or more training videos;
    b. partitioning each training video into pixel blocks;
    c. initializing each of a plurality of mode pairs, each mode pair of the mode pairs includes an intra-predictor and a transform, wherein the transforms of at least two of the plurality of mode pairs are different;
    d. for each pixel block, separately encoding the pixel block using each mode pair such that for each mode pair encoding of the pixel block a characteristic is generated;
    e. for each pixel block, measuring the characteristic of the encoded pixel block for each mode pair encoding;
    f. for each pixel block, classifying the pixel block according to the mode pair having the characteristic that is closest to a defined criteria such that the pixel block is associated with a specific classification and the specific classification is associated with a specific mode pair;
    g. determining block statistics for each pixel block;
    h. accumulating block statistics according to classification;
    i. modifying the intra-predictor and the transform of each mode pair using the block statistics accumulated for each classification, thereby forming modified mode pairs; and
    j. repeating separately encoding the pixel blocks, measuring the characteristic, classifying the pixel blocks, determining block statistics, accumulating block statistics, and modifying the intra-predictor and the transform for a predetermined number of iterations, wherein the plurality of modified mode pairs are modified at least one additional time to generate a plurality of additional modified mode pairs, wherein an average performance of the plurality of additional modified mode pairs is measured and compared to the average performance from a previous iteration.

14. The method of claim 13 further comprises receiving one or more quantization parameters, and separately encoding the pixel block using each mode pair comprises separately encoding the pixel block using each mode pair and each quantization parameter such that the characteristic is generated for each encoding of the pixel block using one of the mode pairs and one of the quantization parameters.

15. The method of claim 13 wherein the statistics for each pixel block include a current classification of the pixel block, pixel data corresponding to the pixel block, and a reconstructed neighborhood pixel data neighboring the pixel block.

16. The method of claim 13 wherein the plurality of mode pairs are initialized according to the H.264/AVC standard.

17. The method of claim 13 wherein each intra-predictor includes intra-predictor coefficients and each transform includes transform coefficients, and modifying the intra-predictor and the transform of each mode pair using the block statistics accumulated for each classification comprises modifying one or more of the intra predictor coefficients and one or more of the transform coefficients.

18. A computing device comprising a non-transitory computer-readable memory for storing one or more training videos, an iterative algorithm and a plurality of mode pairs, wherein the iterative algorithm includes code configured to perform a method comprising:
    initializing each of the plurality of mode pairs, each mode pair of the mode pairs includes an intra-predictor and a transform, wherein the transforms of at least two of the plurality of mode pairs are different;
    encoding the one or more training videos using the plurality of mode pairs;
    accumulating statistics corresponding to the encoded one or more training videos; and
    modifying the intra-predictor and the transform within each mode pair according to the accumulated statistics, thereby forming a plurality of modified mode pairs, wherein the plurality of modified mode pairs are modified at least one additional time to generate a plurality of additional modified mode pairs, wherein an average performance of the plurality of additional modified mode pairs is measured and compared to the average performance from a previous iteration.

19. The computing device of claim 18 wherein the memory stores an iterative mode selection module including code configured to determine the mode pair used to encode each pixel block within each of the one or more training videos.

20. The computing device of claim 18 wherein the iterative algorithm further comprises;
    a. encoding the one or more training videos using the plurality of modified mode pairs;
    b. measuring a performance of the encoding using the plurality of modified mode pairs; and c. comparing the measured performance to a predetermined value, and if the measured performance is greater than the predetermined value, then accumulating statistics and modifying the intra-predictor and the transform are repeated.

21. The computing device of claim 18 wherein the iterative algorithm further comprises;
   a. encoding the one or more training videos using the plurality of modified mode pairs; and
   b. repeating accumulating statistics corresponding to the encoded one or more training videos and modifying the intra-predictor and the transform within each mode pair according to the accumulated statistics for a predetermined number of iterations.

22. The computing device of claim 18 wherein the memory is further configured to store one or more quantization parameters, and the iterative algorithm further comprises separately encoding each of the one or more training videos using each mode pair and each quantization parameter such that the characteristic is generated for each encoding of each of the one or more training videos using one of the mode pairs and one of the quantization parameters.

23. The computing device of claim 18 wherein the statistics are associated with each pixel block in the one or more training videos and the statistics include a current classification of the pixel block, the pixel data corresponding to the pixel block, and a reconstructed neighborhood pixel data neighboring the pixel block.

24. The computing device of claim 18 wherein the plurality of mode pairs are initialized according to the H.264/AVC standard.

* * * * *